J. C. POTTER.
MULTIPLE TABLE MILLING MACHINE.
APPLICATION FILED OCT. 1, 1913.

1,186,681.

Patented June 13, 1916.
7 SHEETS—SHEET 5.

WITNESSES:
H. F. Rueth
A. F. Nayes

INVENTOR
James C. Potter
BY
Chas. J. Williamson
ATTORNEY

J. C. POTTER.
MULTIPLE TABLE MILLING MACHINE.
APPLICATION FILED OCT. 1, 1913.

1,186,681.

Patented June 13, 1916.
7 SHEETS—SHEET 6.

WITNESSES:
H. G. Rueth
A. T. Hayes

INVENTOR
James C. Potter
BY
Chas. J. Williamson
ATTORNEY

UNITED STATES PATENT OFFICE.

JAMES C. POTTER, OF PAWTUCKET, RHODE ISLAND.

MULTIPLE-TABLE MILLING-MACHINE.

1,186,681.  Specification of Letters Patent.  Patented June 13, 1916.

Application filed October 1, 1913. Serial No. 792,841.

*To all whom it may concern:*

Be it known that I, JAMES C. POTTER, of Pawtucket, in the county of Providence and in the State of Rhode Island, have invented a certain new and useful Improvement in Mutiple-Table Milling-Machines, and do hereby declare that the following is a full, clear, and exact description thereof.

The object of my invention, broadly stated, is to improve the construction of milling machines to the end that the range of work and its output shall be largely increased, both by reason of the machine construction itself and by lightening the labors of the workman and reducing the number and extent of the movements he must make in attending to the machine.

In the accompanying drawings—

My invention relates to milling machines, and more particularly to the multiple-table type for which I obtained Letters Patent No. 1,060,705, May 6, 1913. This type of machine comprises in the form in which I prefer to embody my invention, a revolving turret which has work tables, or supports, situated eccentrically to the turret axis, so that by the revolution of the turret the several pieces of work carried thereby may be brought, in succession, into position for the milling operation, and removed therefrom, in succession, thus enabling the operation on one piece of work to be carried on simultaneously with the removal of a finished piece of work and the substitution therefor of a new piece. Since the machine does not have to wait upon the workman, nor the workman upon the machine, both are busy at the same time, and accordingly the output is large. By my machine forming the subject of this application, upon the depression of the treadle the work-table carrying turret is unlocked, is revolved to shift one work-table from position for the milling tool to work and another table into such position, the revolution of the turret is automatically stopped at the desired point and it is automatically locked and clamped; the work-table feed is controlled, so that it stops and reverses automatically, and the turret revolve is effected at a constant speed independent of the rate of feed of the work-table although both derive their motion from a common shaft, and said constant speed is automatically controlled. The workman stands in one place to perform the few operations of depressing the treadle and removing the milled work from the table and replacing it with a new piece so that no time is lost in moving about, and as the turret rotation and feeding are done mechanically, or by power, he has no heavy labor to do.

As in the case of the machine shown in my aforesaid patent, the turret or revoluble work-carrier 10 rests at its bottom in an annular channel 11 in the top of the machine frame 12, and the tool spindle 13 being above the turret, the multiple table 14 carried by the turret, will be revolved to bring one piece of work placed thereon to position beneath the tool, and to remove a previously placed piece of work from such position, for its removal from the work-table and the substitution therefor, of a new piece of work. The multiple work-table can take the form of several work-receiving portions or holders, each having its own slide and each its own feeding mechanism, as in the case of the machine which illustrates my invention in my aforesaid patent, or, as shown in the drawings herein, it may consist of several, preferably two, work-receiving portions or tables 16, comprising each the usual T-slots 17 for bolting the vise thereto, united together in one slide member, or piece and having a single feed mechanism, or reciprocating means, for both.

For some reasons it may be preferable, in some machines, to have the work-table forming portions of the machine in the form of separate independently movable slides; while in other cases, it may be preferable to have then united in a single member, and incapable of independent sliding movement, but I do not limit myself to either arrangement, as I consider both to be within the purview of my invention, broadly considered. As in the case of the machine shown in my aforesaid patent, the table-feeding means comprises a screw shaft 18 journaled in bearings on the underside of the slide, and a nut 19 on the upperside of the turret, and a shaft 20 parallel with the feed screw and geared thereto and adapted to be revolved in either direction, or stopped, by an arrangement of bevel gears and a clutch device. There are two oppositely arranged bevel gears 21 loose on the shaft 20, both of which are in mesh with a bevel gear 22 on the upper end of a vertical shaft 23, concentric with the turret which is geared to and receives motion from the main driving shaft, as hereinafter described, so that thereby the feed may be done by power. At times it is desirable to do the feeding by hand and for this purpose I provide at one end of the slide a cross shaft 24 which is geared to the feed screw at one end by spiral gears 25. Said cross shaft is squared at each end at the sides of the table for the application of a hand crank. By this arrangement of the shaft and the location of the crank receiving ends at the sides of the table, it will be seen that the workman can apply the crank and operate the feed screw without moving from the position at the front of the machine where the work is applied and removed. Between the two bevel gears, and splined to the shaft 20 is a clutch collar 26 engaged by a fork 27 which is slidably mounted concentric with the feed screw 18. Attached to the fork 27 is a rack 28 with which meshes a gear segment 290 on a rock shaft 30 that passes through the turret at right angles to the feed screw, and which on each end, outside the turret, has a crank arm 29 by which the shaft may be rocked by hand to engage the clutch with either one bevel gear or the other, or be placed in a neutral position. A suitable spring latch 290 is provided to yieldingly hold the crank arm 29 in each of the three positions required for such adjustment of the clutch collar. Near one end the rock shaft 28 has two diametrically opposite radial fingers 31, each of which engages the lower end of one of a pair of vertically slidable rods or plungers 32, mounted in guide holes in the turret, with their upper ends beveled and projecting above the latter and in the path of one or the other of a pair of dogs 33 secured to the side of one of the work table members, so as to partake of the sliding movement of the latter and by such movement caused to engage the beveled end of the plunger that stands higher than the other so as to be in the path of one dog or the other, and said plunger thereby depressed and the rock shaft turned to a mid-position so as to shift the clutch collar 26 to a neutral position between the two bevel gears, and thereby stop the feed of the work tables. The feed stopping dogs 33 are adjustably attached to the work table side so that they may be set to stop the feed to suit the length of the work being milled.

Each crank arm 29 has a tail 34 against which bears the upper end of a vertically slidable plunger 35 situated in a housing 36 on the machine base, and normally pressed upward by a spring 37, so as to tend to rock the clutch shifting shaft to shift the clutch from neutral position and place it in engagement with one bevel gear, or the other, for feeding the work tables. Said plunger 35 is depressed by the action of one of the dogs 33 on one of the plungers 32 to shift the clutch to neutral position, as I have described, and it is latched in such position until it is automatically released and thereby the feed motion is automatically resumed. It is so latched by a bell crank lever 38, pivoted to the housing 36 with one arm in position to engage the top of a lateral stud 39 on the plunger 34 and its other arm in position to be engaged and tripped by one of two dogs 40 pivoted to the sides of the turret diametrically opposite each other and carried thereby into tripping engagement with the latch lever 38. When the latch is thus tripped, the plunger 35 is moved upward by its spring, and thereby the rock shaft 28 is turned to shift the clutch from neutral position to engage one bevel gear or the other of the feed mechanism. It will be seen that the two plungers 32 and two dogs 33, one for each plunger are required, because, in effect, the work table feed is reversed. Though both tables move simultaneously in the same direction when successive pieces of work are being milled, in effect the direction of travel is reversed, because the half turn of the turret reverses the position of the work from the far to the near side of the milling tool. Inasmuch as there are two crank arms 29, at diametrically opposite sides of the turret, but one plunger 35 is required, because by the half revolution of the turret, the crank arms 29 are successively brought into operative relation with the one plunger 35. By the action of the plunger 35 on the crank arm tails in succession, first one plunger 32 is elevated into the path of its dog 33, and then the other plunger 32 is elevated into the path of its dog, and thus alternately by the reversal of travel of the work table, the dogs act on their respective plungers.

The shaft 23 is utilized to revolve the turret. For this purpose, it has keyed to it a circular plate or disk 41 which on its rim carries a split friction ring 42 adapted when expanded to bear against the inner periphery of an annular flange 43 that depends from the under side of the turret with sufficient pressure to clutch the two together and thus cause the revolution of the turret. To expand said split ring, a pin 44 is slidable radially in the disk which at its outer end enters the split in the ring, and at its inner end is engaged by a lever 45 pivoted at one end to the disk and at its other end has a roller in position to be engaged by an inclined surface 46 on a vertically slidable collar 47 mounted on the hub of the disk 41 and having a horizontal flange 48 which rests upon the upper ends of vertically movable posts that are lifted by a treadle 49, as in the machine of my aforesaid patent, when it is desired to clutch the turret to the shaft 23, the treadle, at its inner end rising into contact with and lifting a yoke or spanner 50 that connects said posts 51. The treadle is also utilized to unlock the turret preliminary to its rotation, its inner end being jointed to a lever 52 that is connected by a link 53 with the lower end of a spring pressed locking bolt 54 whose upper end may be projected into or disengaged from holes 55, which, by the rotation of the turret are brought successively into alinement with the locking bolt. The first effect of the depression of the treadle is to withdraw the locking bolt, and thereafter it reaches and lifts the yoke 50 to clutch the disk 41 with the turret flange 43. When the treadle has been depressed far enough to clutch the turret to its rotating mechanism, it is there held by a latch 56 pivoted on the outside of the casing 12, and having near its lower end a shoulder 57 that swings over the treadle. At its upper end the latch 56 lies in the path of two diametrically opposite dogs 58 projecting from a disk 59 that is suitably geared to the turret, so that for each half turn of the latter one of the dogs 58 will trip the latch 56, and release the treadle and cause the unclutching of the turret from its rotating mechanism, so that when the turret has been indexed, it will be automatically disconnected from its rotating mechanism and automatically locked in its indexed position. The gearing between the turret and the dog-carrying disk may consist of a worm wheel 60 on the same shaft with the disk, a worm 61 meshing with the worm wheel and on a vertical shaft 62 having a pinion 63 in mesh with a gear 64 on the rim of the turret flange 43. On the shaft of worm wheel 60 is a bevel gear 65 in mesh with a bevel gear 66 on a shaft 67 having a squared end for a hand crank for the purpose of turning the turret by hand, when necessary.

Besides the locking bolt to hold the turret, after it has been indexed, I provide a clamp or binder that is automatically tightened and released. Said binder is in the form of a block 68 situated to impinge against the periphery of the turret in its bearing on the casing 12, said block being mounted on a screw 69 that engages internal thread in a bushing 70, and outside the latter has a gear segment 71 with which meshes a gear 72 on a rock shaft 73. The latter has a crank arm 74 having a jointed connection 75 with the upper end of a pitman or link 76 whose lower end has a slot and pin connection 77 with a finger 78 pivoted to an arm 79 which is connected with the treadle, so as to partake of the movement thereof. A spring 80 connected with the link 76 normally tends to lift the latter and through the connections described to turn the screw 69 and jam the block 68 against the turret. When the treadle is depressed, the screw is turned in the reverse direction and the binder is released, and it is kept in a released condition until the treadle rises, by a spring-actuated latch 81 which engages a lateral lug 82 on the link 76 when the latter it fully lowered by the depression of the treadle. When the treadle is automatically released, and flies upward, a stud 83 in the form of an adjustable bolt strikes the tail of the latch 81 and disengages it from the link 76 whereupon the binder is automatically applied by the lifting of the link 76 by its spring. To allow adjustment for unavoidable wear the binder block 68 has a threaded stem 680 which passes through an internally threaded hole in the screw 69 and at the outer end the latter has a check nut 681.

On its lower end the turret rotating and feed screw revolving shaft 20 has a worm wheel 84 in mesh with a worm 85 on a horizontal shaft 86 and as it is desirable to change the rate of feed for different work by changing the speed of said shaft, and as the latter might thus be run at speeds undesirable for revolving the turret, I provide means whereby said shaft may be run at a constant speed when the turret is to be revolved, independently of the speed it has for feeding the work, this being possible because when the turret is to be revolved the work is not being fed to the milling tool. Loose upon said shaft 86 is a gear 87 adapted automatically to be clutched thereto by a suitable clutch. Thus when a rate of feed that requires no lower speed of the shaft 86 than that for revolving the turret is required the automatic roll type clutch shown in Figs. 14 and 15 may be employed, but I do not limit myself to any particular type of clutch. Meshing with said gear 87 to revolve the same is a gear 89 on a shaft 90 having a pinion 91 in mesh with a gear 92 on a shaft 93 having a band wheel 94 for belting to a counter shaft. Meshing with the gear 92 is a gear 95 on a shaft 96 and on the latter is a gear 97 in mesh with a gear 98 on a shaft 99 in line with the shaft 86 and having a clutch face 100 adapted to coact with a clutch collar 101 splined to the shaft 86 so that when clutch collar and clutch face engage, the shaft 86 will be driven from the band wheel through the gears 97 and 98 (which are change gears) and when said clutch members are disengaged the shaft 86 will be revolved from the band wheel through the gear 87 and the roll or other clutch, and at a speed that is fixed or constant, and such gear and clutch connection is established automatically when the treadle is operated to unlock the turret and clutch it to the disk 41 by connecting the lever 102 which engages the clutch collar, with an arm 103 of the turret lock releasing lever 45 by means of a link 104 having a slot and pin connection with the lever 102, that allows sufficient lost motion of the link when moved by the arm 103, to assure the withdrawal of the locking bolt from the turret before the gear 87 is rendered active to revolve the turret. Such lost motion is also useful in allowing the unlocking of the turret without at the same time disconnecting the feed with the change gears, so as to allow the turret to be turned by hand to place the table at an angle, when it is desired to mill work in an inclined direction, the turret being sufficiently locked in this case by the binder which may be released by disengaging its latch by hand and not allowing the treadle to lift high enough to release said latch. Or the wear adjusting screw stem 680 of the binder block 68 could be turned by hand to clamp first releasing the check nut on said stem.

Figure 1:
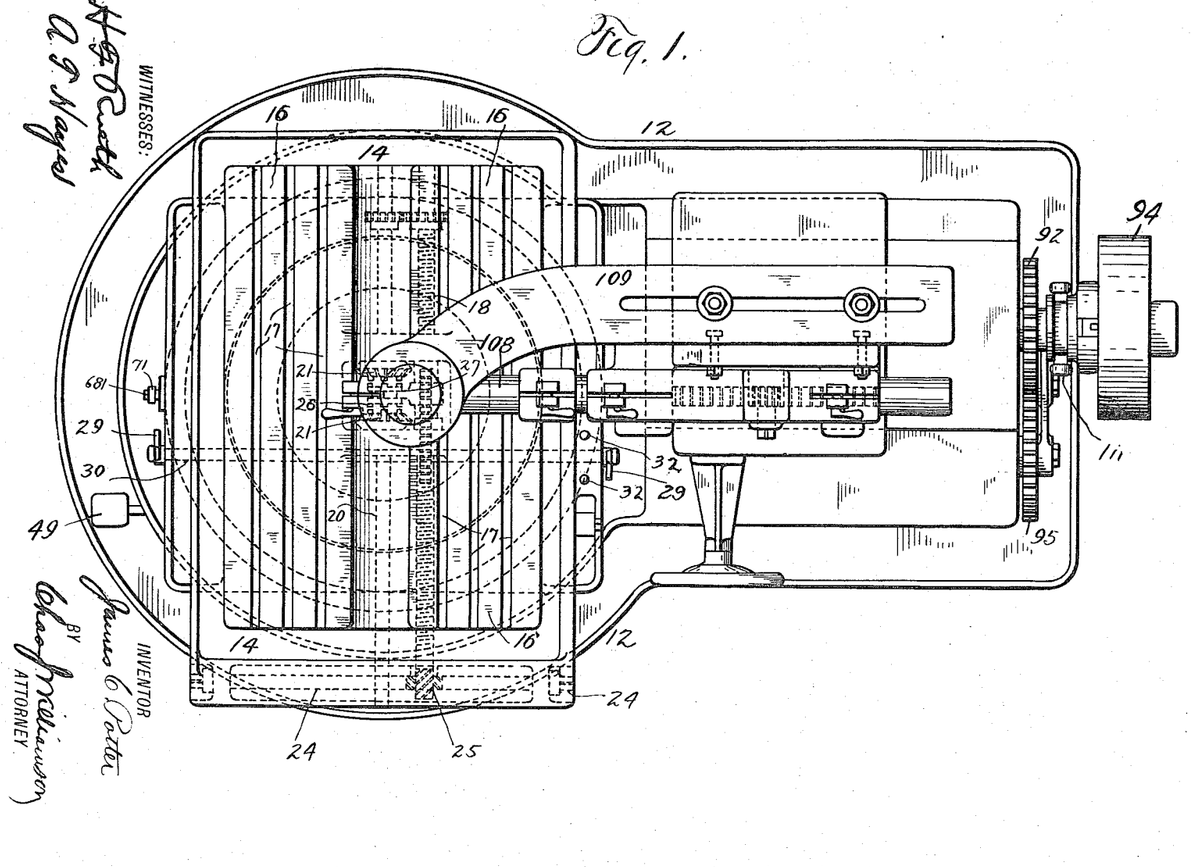
Figure 1 is a top plan view of a machine embodying my invention.
Figures 2, 7, 8, 9, 10:
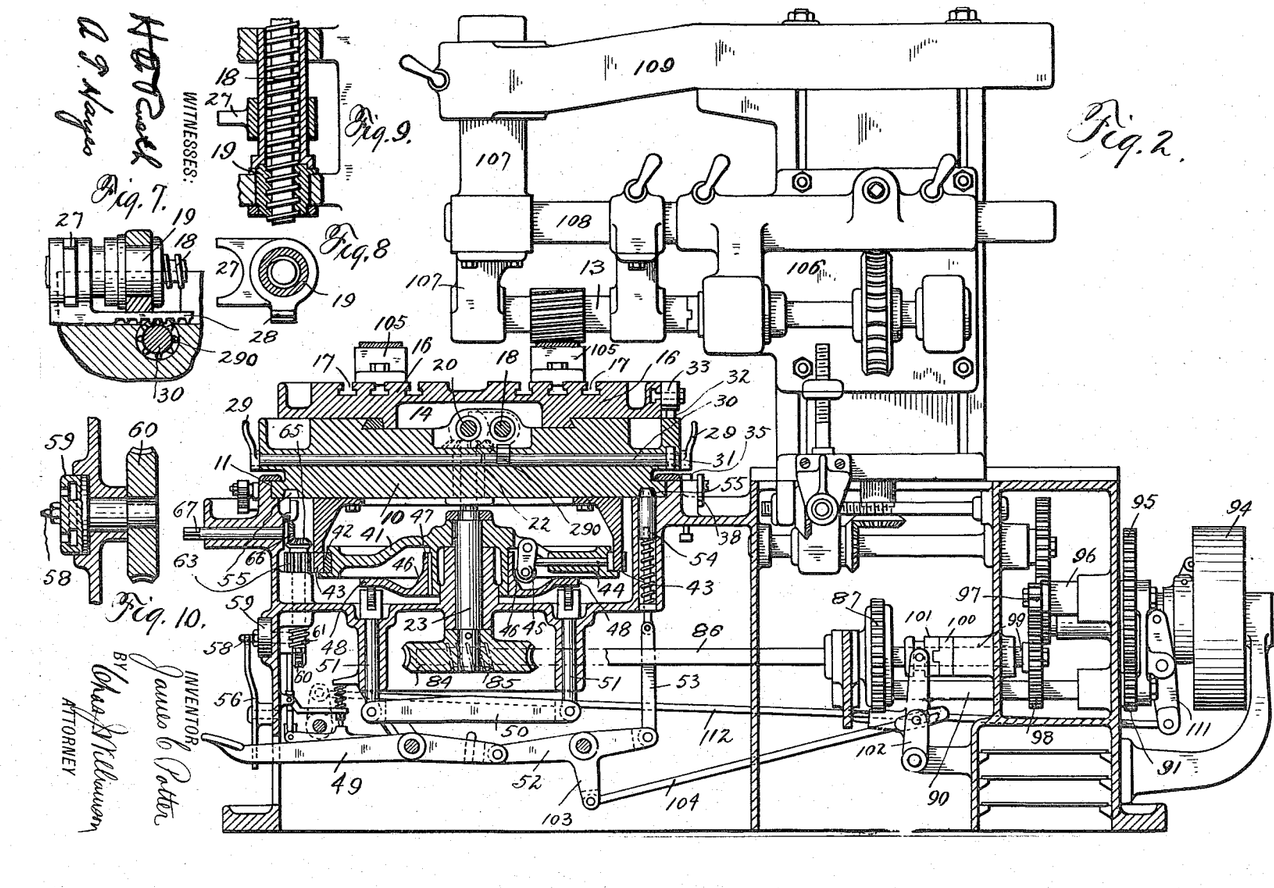
Fig. 2 is a vertical, longitudinal section thereof.
Figs. 5 to 9 are detail views of the automatic table feed controlling devices.
Fig. 10 is a detail view in section of a portion of the automatic mechanism for stopping the rotation of the turret.
Figures 3, 11:
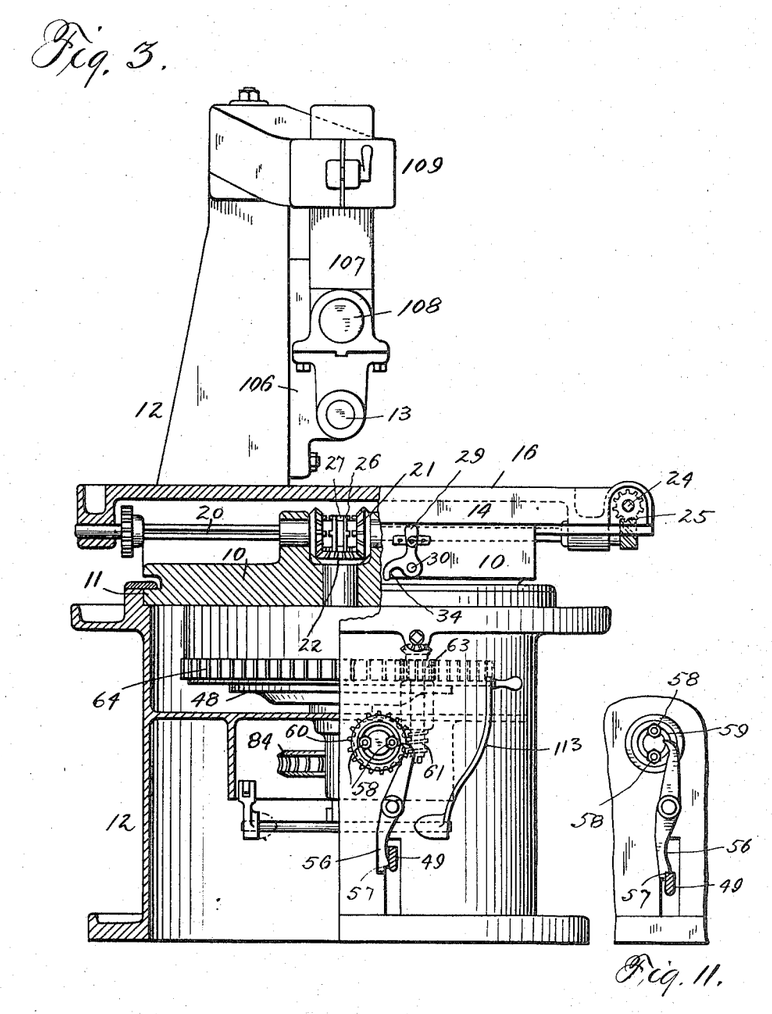
Fig. 3 is a view, partly in front elevation, and partly in section.
Fig. 11 is a front elevation thereof.
Figures 4, 14, 15:
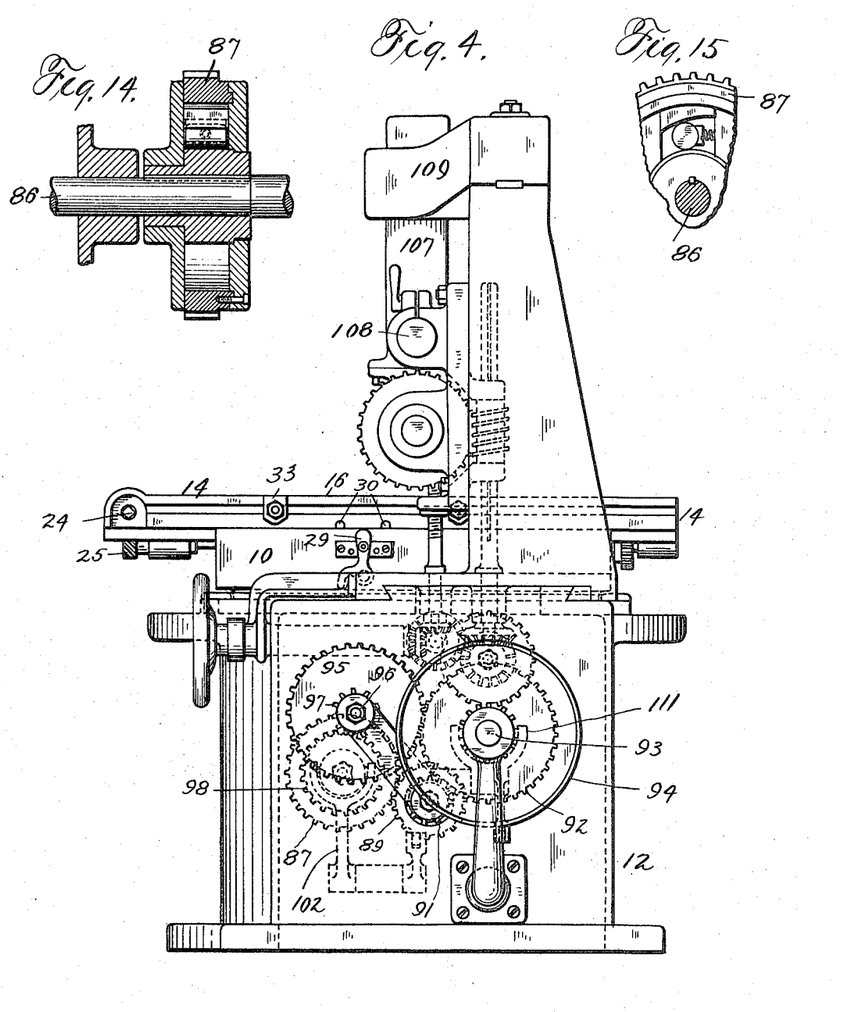
Fig. 4 is a rear elevation.
Figs. 14 and 15 are detail views of a form of clutch that may be used in the turret-revolving mechanism.
Figure 5:
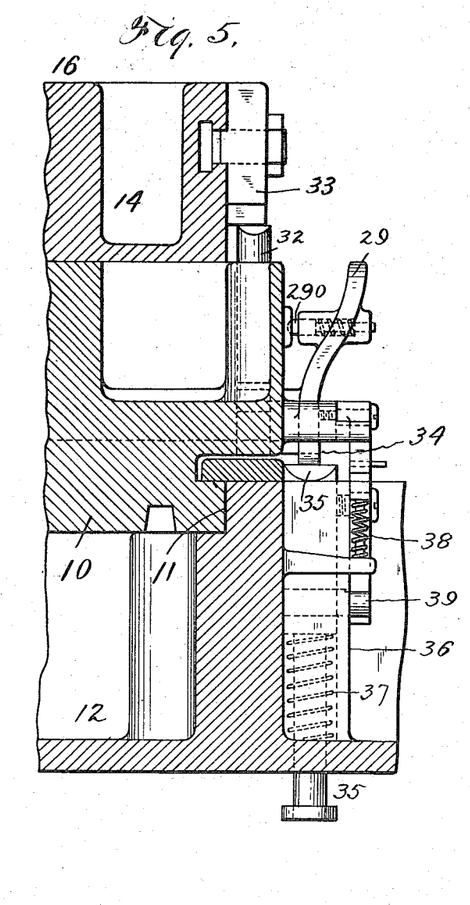
Figure 6:
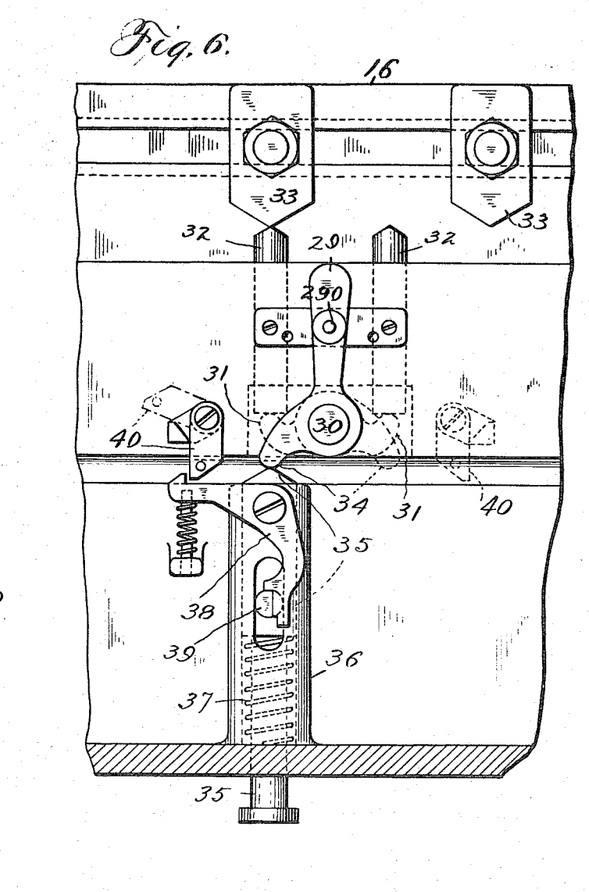
Figure 12:
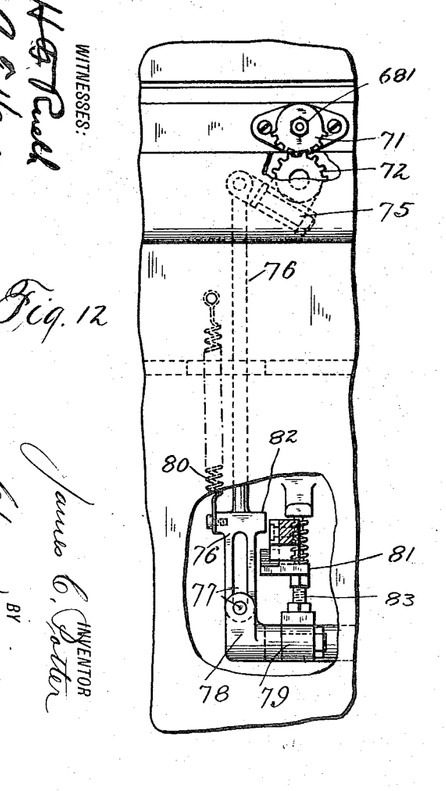
Figs. 12 and 13 are detail views of the automatic turret clamping mechanism.
Figure 13:
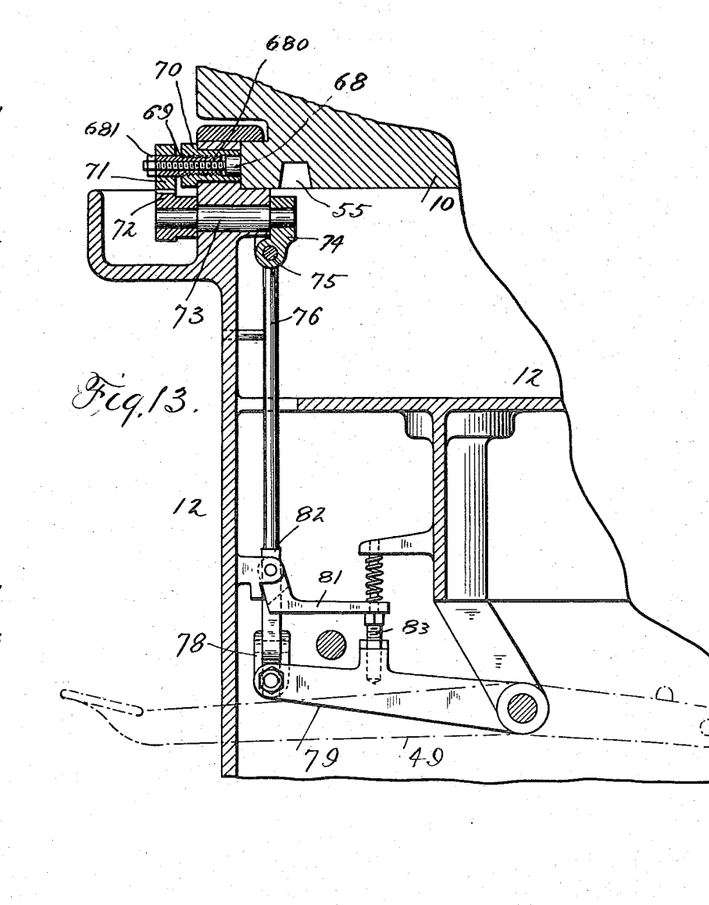
Figure 16:
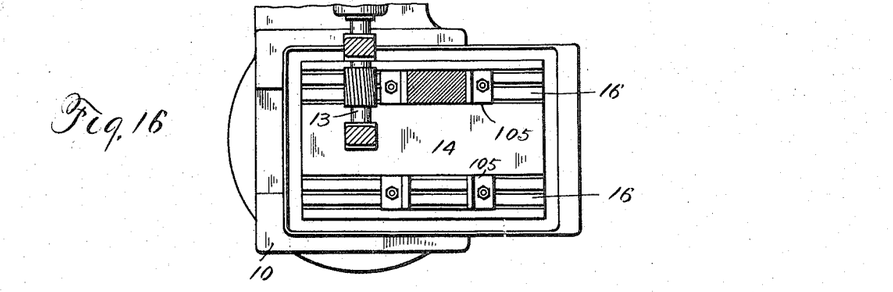
Figs. 16 to 18 are top plan views somewhat diagrammatic, to illustrate the table rotating and feed operations.
Figure 17:
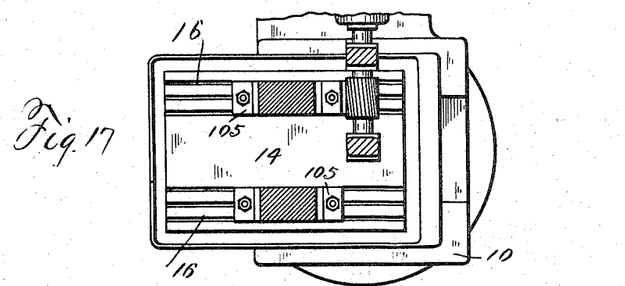
Figure 18:
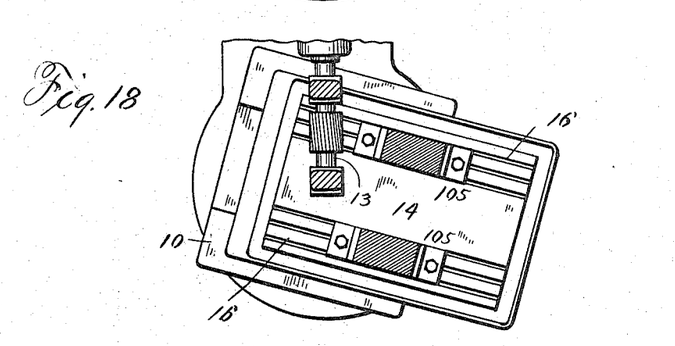
Figure 19:
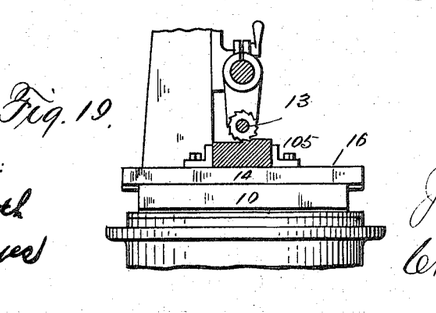
Fig. 19 is a detail view, in side elevation, showing the work being operated on by the milling tool.

The vises 105 are placed in the same relative positions on the work tables, and as both, with the work thereon feed in the same direction at the same time, it follows that after the piece being operated on by the milling tool is finished, and then the turret is indexed for the next piece, the latter when brought around to the tool will be at once ready for beginning the cut without any preliminary feed; and thus waste of time in feeding is saved. Figs. 13 to 15 illustrate this feature of the machine, Fig. 13 showing a piece of work in one vise the other vise being ready to receive a piece of work and the slide being ready for beginning the feeding movement; Fig. 14 shows work in both vises and after the feed or travel of the slide has gone to a point where the milling operation is finished; and Fig. 15 shows the turret partially turned in the operation of bringing the new piece of work into position under the milling tool ready for the feding operation.

The spindle 13 is mounted on a slide, 106 as usual, and at its outer end is supported by a vertical post 107 that itself is supported by two horizontal bars, one of which bars 108 is carried by the slide and the other bar 109 is bolted to the top of the machine frame, and thus a rigid, strong support for the spindle is provided without any contact with the table-carrying slide, which would be objectionable. The spindle is geared to the driving shaft 93 by a train of gearing that includes change gears, but no description thereof is necessary.

The machine may be thrown into and out of operation by a clutch for the band wheel, the clutch operating fork 111 of which is connected by a rod 112 to a hand lever 113 at the front of the machine within convenient reach of the workman.

Having thus described my invention what I claim is—

1. In a milling machine, the combination of a spindle, a slide having multiple workholders, a support for the slide movable with reference to the spindle to place the holders successively in working relation to the spindle tool, and means to traverse the slide relative to the spindle.

2. In a milling machine, the combination of a spindle, a slide having multiple workholders that are in fixed positions relative to each other and to the slide, a support for the slide movable with reference to the spindle to place the holders successively in working relation to the spindle tool, and means to move the slide, and the holders therewith transversely of the spindle tool, the movement of the holders being simultaneous and in the same direction.

3. In a milling machine, the combination of a spindle, a slide having multiple workholders, a turret upon which the slide is mounted, the turret axis being situated between the workholders, and means to traverse the slide on the turret relative to the spindle.

4. In a milling machine, the combination of a spindle, a slide having multiple workholders, a turret upon which the slide is mounted, the turret axis being situated between the workholders, means to partially rotate the turret, means to fix it in the position to which it is turned, and means to traverse the slide on the turret relative to the spindle.

5. In a milling machine, the combination of a spindle, a plurality of workholders, a movable support by which the workholders are brought successively into working relation with the spindle tool, said workholders being slidably arranged on the support, workholder feeding means, and means actuated by the rotation of the support to stop and start the holder feeding means.

6. In a milling machine, the combination of a spindle, a turret, a work-receiving table carried by said turret, table feeding means, turret rotating mechanism, a shaft common to the table feeding means and the turret rotating mechanism, means to revolve said shaft to actuate the feeding means, and means to drive said shaft independently of the feed at a different speed to actuate the turret rotating mechanism.

7. In a milling machine, the combination of a spindle, a turret, a work-receiving table carried by said support, table feeding means, turret rotating mechanism, a shaft common to the table feeding means and the turret rotating mechanism, a drive shaft, and independently operable connections between the drive shaft and said common shaft whereby the latter may be revolved at different speeds for feeding the table and rotating the turret respectively.

8. In a milling-machine, the combination of a spindle, a turret, a work-receiving table carried by said turret, table feeding means, turret rotating mechanism, a turret lock, a shaft common to the table feeding means and the turret rotating mechanism, a driving shaft, independent clutch controlled connections between the driving shaft and said common shaft, and an operating lever connected with said locking device and with the clutch for controlling the connections of said common shaft with the drive shaft.

9. In a milling machine, the combination of a frame, a work table, a spindle, and a spindle support mounted on the frame comprising two members extending in the same direction as the spindle, and a post connecting the spindle and said two members.

10. In a milling machine, the combination of a frame, a work table, a spindle, a spindle-carrying slide mounted on the frame, a spindle-supporting member extending from the slide parallel with the spindle, a post connecting the spindle and said member, and a member extending from the frame in the same direction as the spindle and also connected with said post.

11. In a milling machine, the combination of a spindle, a turret, a work-receiving table carried by said turret, table feeding devices, including power transmitting means, turret-rotating mechanism, including power transmitting means, a constant speed means for rotating the turret, a driver from which power may be taken to feed the table and to rotate the turret, and means for changing the connection between the driver and the table-feeding device and between the driver and the turret-rotating mechanism.

12. In a milling machine, the combination of a spindle, a turret, a work-receiving table carried by said turret, table feeding devices including a gear train, turret rotating mechanism, including a gear train, a shaft adapted to be driven by both of said gear trains, and means for connecting said gear trains alternately to the shaft.

13. In a milling machine, the combination of a spindle, a turret, a work receiving table carried by said turret, table feeding means, turret rotating mechanism, a main driving shaft, and independently operable connections between the latter and the table feeding means and turret rotating mechanism including a shaft and separate gear trains between the latter and the main driving shaft.

In testimony that I claim the foregoing I have hereunto set my hand.

JAMES C. POTTER.

Witnesses:
EARL H. ROBERTS,
EDWARD J. FEELEY.